No. 834,644. PATENTED OCT. 30, 1906.
F. T. SNYDER.
PROCESS OF TREATING ORES.
APPLICATION FILED JUNE 21, 1905.
3 SHEETS—SHEET 1.
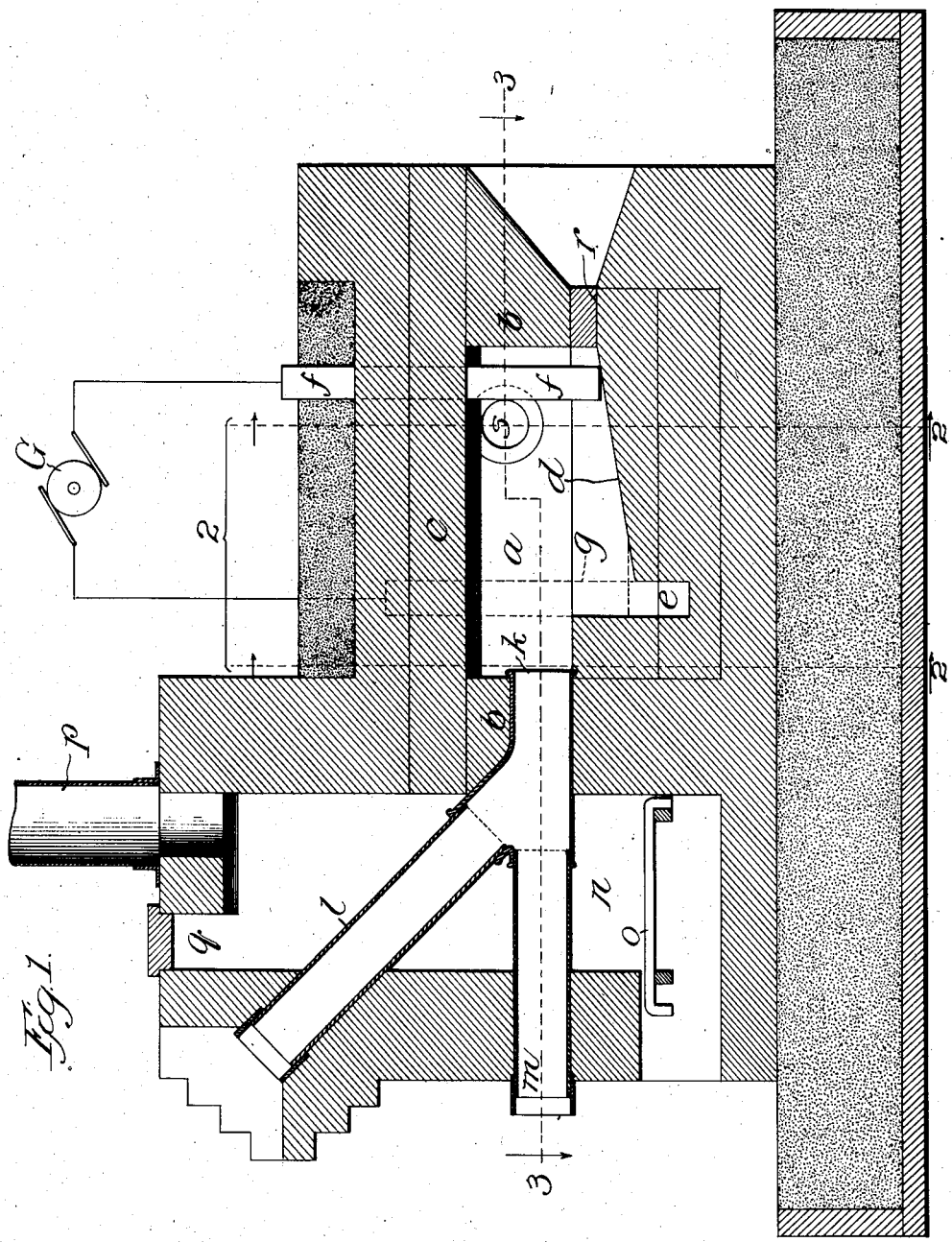
Witnesses:
Irving MacDonald
Alfred H. Moore
Inventor:
Frederick T. Snyder,
By Barton & Banner
Attys No. 834,644. PATENTED OCT. 30, 1906.
F. T. SNYDER.
PROCESS OF TREATING ORES.
APPLICATION FILED JUNE 21, 1905.
3 SHEETS—SHEET 2.
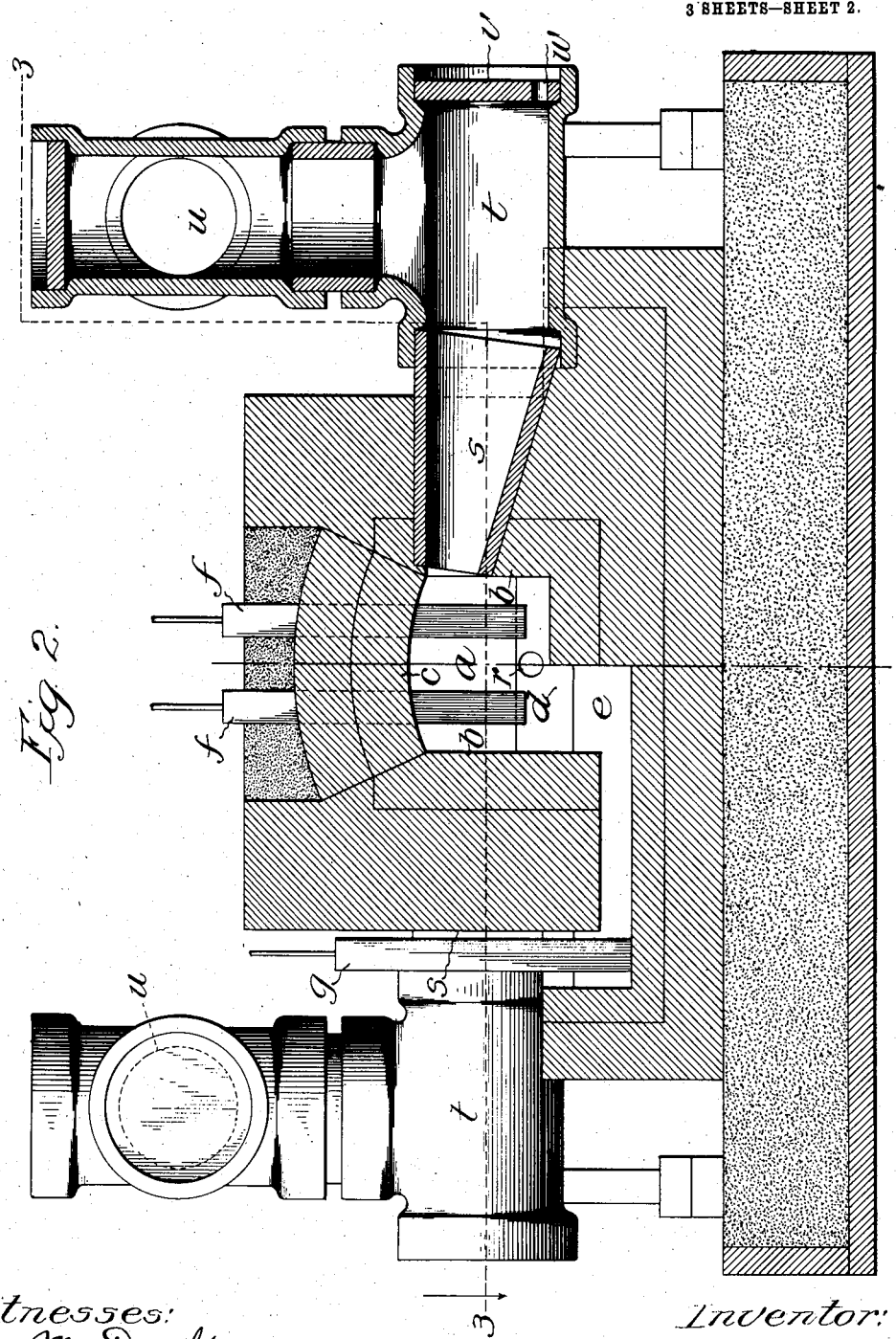
Witnesses:
Irving MacDonald
Alfred H. Moore
Inventor:
Frederick T. Snyder,
By Barton & Banner
Attys.

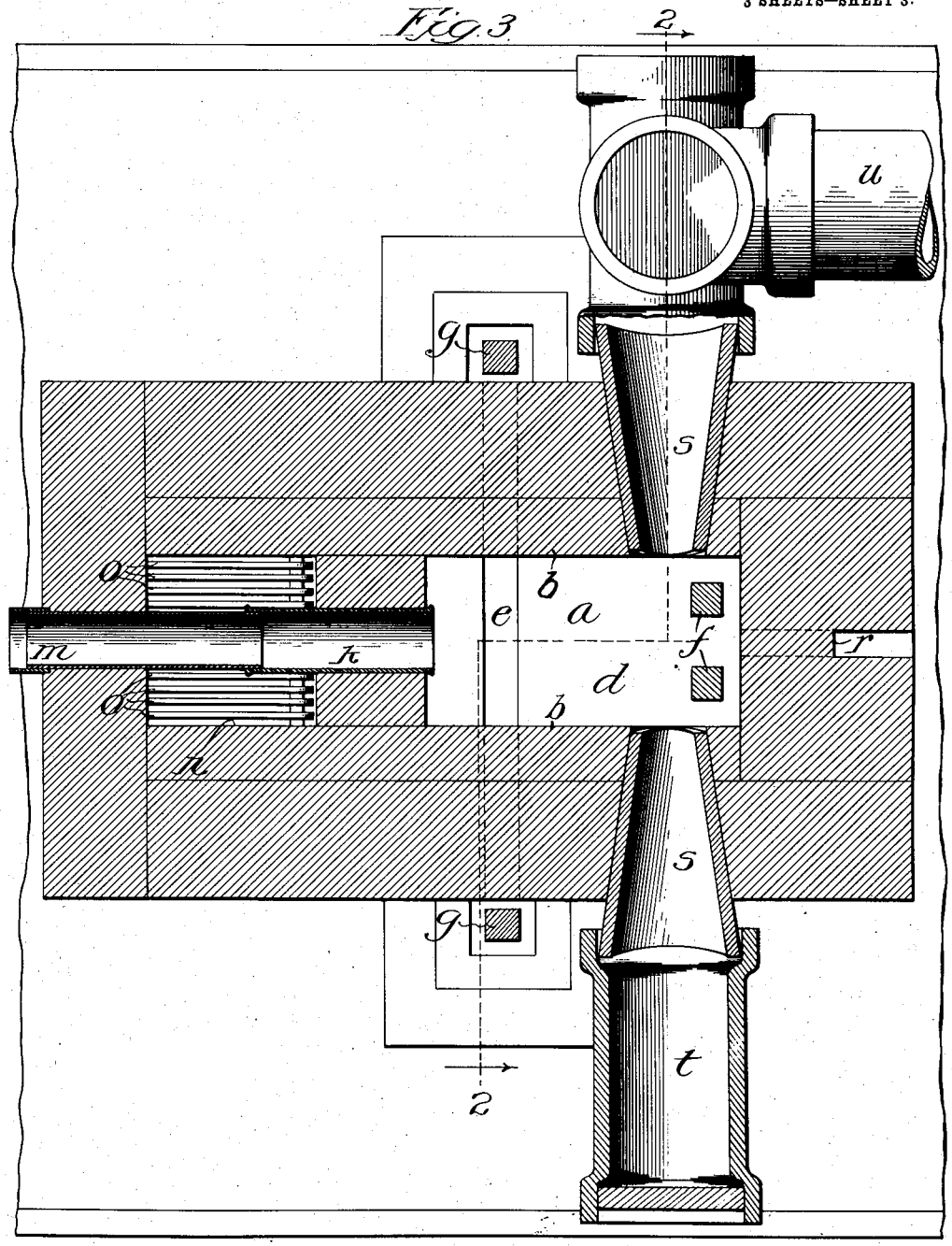

UNITED STATES PATENT OFFICE.

FREDERICK T. SNYDER, OF OAK PARK, ILLINOIS.

PROCESS OF TREATING ORES.

No. 834,644.　　　Specification of Letters Patent.　　　Patented Oct. 30, 1906.

Application filed June 21, 1905. Serial No. 266,208.

*To all whom it may concern:*

Be it known that I, FREDERICK T. SNYDER, a citizen of the United States, residing at Oak Park, in the county of Cook and State of Illinois, have invented a certain new and useful Improvement in Processes of Treating Ores, of which the following is a full, clear, concise, and exact description.

My invention relates to a process of treating ores for the extraction of their metallic constituents, and relates particularly to ores containing metallic compounds which are reduced at different temperatures, the object being the reduction of these compounds with great economy of heat and to produce the different metals in as pure a state as possible.

The invention is particularly applicable to zinc-lead ores and makes it possible to extract substantially all the zinc and lead in a single smelting operation, while obtaining the zinc in metallic form substantially free from lead. In other applications, Serial Nos. 266,540 and 266,541, filed June 23, 1905, I have described methods of treating such ores involving the use of an electric furnace from which air is excluded, the ore being smelted with carbon in the furnace to reduce both the zinc and lead, the lead being collected in liquid form, while the zinc is volatilized and condensed or otherwise separately collected.

In practicing the processes of my applications above referred to I found that the zinc product while commercially good contained a considerable proportion of lead. This I found was due to the fact that in order to obtain as near as possible complete reduction of the zinc the temperature has to be maintained at a point such that a part of the lead would be volatilized and carried over with the zinc-vapor into the condensing-chamber.

My present invention involves developing in a body of ore in the presence of carbon a graduated heat sufficient to reduce the different constituents of the ore at different places in the ore body and progressively advancing the ore body toward the place of increased heat, while separately collecting the metals as they are thus serially reduced. In the treatment of lead-zinc ores, for example, the procedure is substantially as follows: The ore having been first crushed and preferably roasted to convert the sulfids into oxids and to drive out all gases so far as possible, is mixed with crushed carbon, preferably in the form of coke or lean coal, (and with slag-forming materials unless already present in the ore,) and the mixture is then fed onto a bath of molten slag in a furnace in which the heat is developed internally by the passage of an electric current. The heat in the furnace is graduated, so that in one part thereof it will be sufficient merely to start the reduction of the lead, but will be progressively increased to a point considerably above the volatilization temperature of zinc at another portion. The ore being fed into the furnace at the cooler portion thereof is progressively advanced toward the place of increased temperature. In its advance the lead is first reduced and is allowed to settle out below the ore body before the latter is advanced to a place at which any considerable quantity of the lead would volatilize. Finally, the residue, from which practically all the lead has settled out, is pushed on toward the hotter part of the furnace, where the reduction will be completed, the zinc being thoroughly driven out of the ore and slag by intense heat, while the lead previously reduced has been conducted away from the hottest part of the furnace and is protected from the more intense heat by the body of ore and slag above it.

I have found that the desired graduated temperature in the furnace can be conveniently produced by maintaining a body of slag of graduated depth and passing the electric current directly through the slag between the deeper and shallower portions thereof. The degree of heat produced by the passage of an electric current through a conductor depends, of course, upon the resistance of the conductor. In the case of the slag the cross-section gradually decreases toward one end, so that the heat developed by the passage of the current will naturally be greatest in that portion of the slag which is of smallest cross-section. The lead which is reduced and settles out below the ore body naturally tends to flow toward the deepest portion of the furnace, so that as fast as it is reduced it is thus conducted away from the greatest heat. The temperature at which the zinc is reduced, however, is so high that the zinc is immediately volatilized, and the vapor may be collected and condensed in a separate chamber. The heat developed in the shallowest portion of the slag is sufficiently intense, so that the residues advanced to this part of the furnace will be very thoroughly reduced and substantially all the zinc-vapor driven off and boiled out of the slag.

It will be seen that this process is economical of heat, for the reason that instead of requiring the whole body of ore to be heated to a temperature far above that at which some of the metals are reduced it is heated first only to a temperature at which one of the metals is reduced and only the residue is necessarily subjected to the greatest heat required for reducing the remaining metals; but probably the most important advantage of the process in the treatment of lead-zinc ores is that the zinc product is obtained direct from the smelting operation substantially free from lead, so that it does not have to be refined in order to put it in marketable condition.

A furnace suitable for the practice of my improved process is illustrated in the accompanying drawings.

Figure 1 is a sectional elevation of the furnace. Fig. 2 is a transverse sectional view on line 2 2 of Fig. 3. Fig. 3 is a sectional plan view on line 3 3 of Fig. 1.

The same letters of reference designate the same parts wherever they are shown.

In the furnace shown the smelting-chamber $a$ is constructed with thick walls $b$ $b$, of refractory material, a reverberatory roof $c$, and a sloping hearth $d$, having a deep well $e$ at one end. Carbon electrodes $f$ $f$ project down through the roof of the smelting-chamber above the upper end of the sloping hearth in position to dip into the shallower portion of the molten slag in the chamber, which will be kept substantially at the level indicated. The well $e$ at the opposite end of the chamber will contain molten lead to serve as another electrode. This well $e$ communicates with the exterior of the furnace by U-shaped passages, into the outer arms of which conducting-rods $g$ are dipped. The rods $g$ and the rods $f$ are connected, respectively, with the terminals of an electric generator G, so that the current from said generator will pass through the body of molten slag in the furnace between the lead-well $e$ and the carbon electrodes $f$ $f$. As the cross-section of the body of molten material in the furnace is gradually reduced toward the upper end of the hearth and as the slag at the top is of higher resistance than the molten lead, it will be seen that the heat will be developed at the highest degree near the electrodes $f$ $f$, where the slag-bath is of least depth, and will be gradually diminished in intensity toward the opposite end of the furnace.

It is intended that the ore shall be introduced at the rear of the furnace, where the heat is less intense, and a charging door or tube $k$ opens through the rear wall of the furnace above the lead-well $e$ for this purpose. The charging-tube is constructed with an inclined branch $l$, into the upper end of which the ore is introduced and through which it passes to the main charging-tube $k$. The ore in the tube $k$ and the rear end of the furnace can be pushed forward from time to time by a suitable rod or pusher introduced through the outer end $m$ of the tube. The charging-tubes $l$ $k$ are supported in a furnace-chamber $n$, provided at the bottom with a fire-grate $o$ and at the top with a stack $p$ and an opening $q$, through which fuel may be introduced. It is intended that the ore, mixed with crushed carbon, shall be preheated in the charging-tubes $l$ $k$ by heat developed from the combustion of fuel in the chamber $n$ to start the process of reduction so far as possible without the use of the more costly electrical heat, the latter being then required only for the actual smelting operation. A tap-hole $r$ is provided in the wall of the smelting-chamber, through which the surplus slag may be removed from time to time. This tap-hole is normally stopped by a clay plug.

Flues $s$ $s$ lead through the side walls of the furnace to conduct away the zinc-vapor, and, as shown, these flues end in chambers $t$ $t$, which, together with said flues, serve as condensers. Flues $u$ $u$ lead away from the tops of chambers $t$ $t$ to carry off the uncondensed gases. As shown, the flues and condensers may be conveniently formed of tiling. The condensers are shown as formed of a T-joint tile, the outer end being closed with a disk or blank $v$, which may be removed, if desired, to allow the interior to be cleaned from incrustations or collections of zinc-dust. The blank $v$ is provided with a tap-hole $w$ at the bottom, normally closed by a clay plug.

In the operation of the furnace the ore, which has been crushed and preferably roasted, is mixed with carbon, also crushed, and fed into the mouth of the inclined charging-tube $l$, from which it is gradually fed into the furnace by pushing it with a rod introduced through the tube $k$. The tubes $l$ and $k$ being filled with the material, no appreciable amount of air will enter the furnace during the charging operation. The ore in the charging-tubes $l$ and $k$ is heated by the combustion of fuel in the furnace-chamber $n$ to start the process of reduction as far as possible, and so to economize the more costly electrical heat required in the actual smelting operation, the limit to the preheating being that slag must not be formed in the charging-tubes, as this would quickly destroy them. As the ore is advanced into the smelting-chamber $a$ the lead is first reduced and settles out below the body of ore and slag, running down the sloping hearth into the well $e$. The ore nearest the heat is first fused, and the unreduced portions thereof are gradually advanced by the introduction of fresh charges behind, being finally advanced to the forward end of the furnace, where the heat is very intense and thoroughly fuses the materials and drives off substantially all the zinc in the form of vapor. This zinc-vapor passes into the flues $s$ and condensing-chambers $t$, which being inclosed by the walls of the furnace are maintained at a sufficiently high temperature so that the zinc is condensed in liquid form and collects at the bottom of the chambers $t$, from which it may be removed from time to time through the tap-hole $w$. Air should be carefully excluded from the furnace and from the condensers at all times to prevent burning of the zinc. The temperature in the furnace should be maintained at about 1,200° centigrade or more in the hottest portion of the furnace, being gradually reduced in degree toward the other end, at which the ore enters, where it will be materially less. The temperature will of course be varied, however, to meet the particular conditions of the furnace and of the ore being treated. As to the electrical conditions I have found that for a small furnace a current of seven hundred and fifty or one thousand amperes at an electromotive force between the terminals of the furnace of one hundred and fifty to two hundred volts gave good results. The materials of the furnace charge should be proportioned so as to produce a slag which will form at a temperature of approximately 1,000° or 1,100° centigrade. A slag containing approximately thirty per cent. of lime, thirty per cent. of iron oxid, and forty per cent. of silica (or their respective equivalents) will have the desired character. The tendency of zinc oxid to dissolve in the slag may be overcome by having the slag high in lime. Burnt lime should be used in the smelting rather than limestone to avoid the excess of CO gas, which would tend to dilute the zinc-vapor so that it would not condense in liquid form, but as zinc-dust.

While I have described this process particularly with respect to the treatment of zinc-lead ores, for which it is especially intended, it will be evident that the invention herein set forth may be availed of in the treatment of other ores.

I therefore claim—

1. The process of treating mixtures of ores which are reduced at different temperatures, which consists in subjecting a body of such ores, mixed with reducing material, to a graduated heat sufficient to reduce the different metallic constituents thereof at different places in the ore body, collecting in a place of lower temperature the metal reduced at such temperature, progressively advancing the residue of the ore freed from such reduced metal to the place of increased temperature, and separately collecting the metal reduced at such higher temperature.

2. The process of treating mixtures of ores which are reduced at different temperatures, which consists in subjecting a body of such ores mixed with reducing material, to a graduated heat sufficient to reduce the different metallic constituents at different places in the ore body, collecting in molten condition the metal reduced at the lower temperature as the same is reduced, progressively advancing the residues, comprising the more refractory constituents of the mixture freed from said first-reduced ore, to a place of greatly-increased heat, there reducing and volatilizing said refractory constituents, and separately collecting said volatilized metal.

3. The process of treating mixtures of ores which reduce at different temperatures, which consists in advancing a body of such ores mixed with carbon laterally across a furnace, maintaining in the furnace a temperature gradually increasing in the direction of advance of the ore and sufficient to reduce the constituents thereof one after another, collecting the metal first reduced in the place of lower temperature, the unreduced residues only being advanced and subjected to the higher temperature, and separately collecting the metal reduced at such higher temperature.

4. The process of treating zinc-lead ores which consists in developing in a body of such ores, in the presence of carbon, and in the absence of air, a graduated heat sufficient to reduce the lead and zinc at different places in the ore body, collecting the lead in a place of decreased temperature underneath that portion of ore body when the reduction of said lead takes place, progressively advancing the portions of the ore from which the lead has settled out to a place of greatly-increased temperature while retaining said reduced lead in the place of lower temperature, there reducing and volatilizing the zinc, and separately collecting the zinc-vapor; whereby the metallic zinc may be thoroughly extracted from the ore and recovered, without carrying with it any material proportion of lead.

5. The process of treating ores containing zinc and lead, which consists in feeding said ores with carbon into an electric furnace from which air is excluded, reducing from the ore body first the lead and later the zinc, by heat maintained electrically in progressively-increasing intensity as the ore-body is advanced, the ore finally reaching a point where the temperature is maintained well above the volatilization temperature of zinc, and removing the reduced lead from the ore body in a direction away from the place of increased heat, while advancing the remainder of the ore body toward the place of increased heat; whereby substantially all the zinc may be vaporized and separately collected without carrying with it any considerable quantity of lead.

6. The process of treating ores containing metallic constituents reducing at different temperatures, which consists in maintaining a slag-bath of graduated depth, feeding said ores with carbon and slag-forming materials upon said slag-bath at the deeper portion thereof, progressively advancing said ore toward the shallower portion of said bath, passing an electric current through the slag between the shallower and deeper portions thereof, to develop a temperature progressively increasing in degree toward the shallower portion and sufficient to reduce the different constituents of the ore one after another as the ore is advanced.

7. The process of treating ores containing metallic constituents reducing at different temperatures, which consists in maintaining a bath of slag of graduated depth, feeding said ores mixed with carbon and with slag-forming materials upon said slag-bath at the deeper portion thereof, gradually advancing said ore toward the shallower portion of said slag-bath, and passing an electric current through said slag to maintain therein a graduated temperature progressively increasing in intensity toward the shallower portion thereof and sufficient in degree to reduce the constituents of the ore one after another as the ore is advanced, said heat being sufficient at the shallower portion of the slag to volatilize the metal last reduced and to thoroughly drive the same out of the slag; the metal first reduced being collected below the deeper end of the slag-bath.

8. The process of treating zinc-lead ores which consists in electrically developing in a body of such ores mixed with carbon, in the absence of air, a graduated heat sufficient to reduce the lead and the zinc at different places in the ore body, collecting the lead in molten condition as it is reduced, progressively advancing the residue of the ore substantially free from lead, to the place of increased temperature, and there reducing and volatilizing the zinc while retaining the lead in the lower temperature, and separately collecting the zinc-vapor.

9. The process of treating ores containing both zinc and lead compounds, which consists in heating a body of such ore with carbon in the absence of air to a temperature at which the lead will be reduced, collecting and removing the reduced lead, and progressively advancing the residue of the ore freed from lead to a place of increased temperature sufficient to reduce the zinc, and separately collecting said zinc.

In witness whereof I hereunto subscribe my name this 19th day of June, A. D. 1905.

FREDERICK T. SNYDER.

Witnesses:
De Witt C. Tanner,
Alfred H. Moore.